Jan. 9, 1940.   L. BERTELE   2,186,621

LENS SYSTEM

Filed June 15, 1938

Inventor:
Ludwig Bertele

Patented Jan. 9, 1940

2,186,621

UNITED STATES PATENT OFFICE 2,186,621

LENS SYSTEM

Ludwig Bertele, Dresden, Germany, assignor to Zeiss Ikon Aktiengesellschaft, Dresden, Germany Application June 15, 1938, Serial No. 213,764
In Germany July 13, 1937

6 Claims. (Cl. 88—57)

The invention relates to improvements in lens systems and particularly is directed to lens systems employed in photography and having a relatively large aperture.

It has been proposed heretofore to compose a lens system having a relatively large aperture of three lens units separated from each other by air spaces, and in which the first unit, which faces the subject to be photographed, and the last or third unit which faces the picture window, are collective units, while the center unit is a meniscus-shaped unit comprising a number of lenses cemented together and having its convex outer face directed toward the first unit.

Recent investigations have disclosed that it is practically possible to obtain with a lens system of this type not only relative large apertures, but also an excellently sharp definition of the images, there remained, however, always an irremovable trace of image distortion after all other image error are removed as far as possible.

It is now an object of the present invention to compose a lens system having a large relative aperture of four lens units separated from each other by air spaces and in which the first, third and fourth unit are collective units, the outer face of the third unit directed toward the fourth unit or the image being convex. Preferably, the third lens unit is composed of a plurality of lenses cemented together and is provided with at least one collective cemented face. The second lens unit is composed of a meniscus shaped lens unit curved toward the first lens unit and provided at least with one dispersive cemented face.

In accordance with the invention the fourth collective lens unit, added to the above mentioned known three lens unit system and separated from the same by an air space, will result in a complete removal of the image distortion error even for larger picture angles without reducing the extremely sharp definition of the image.

Figure 1:
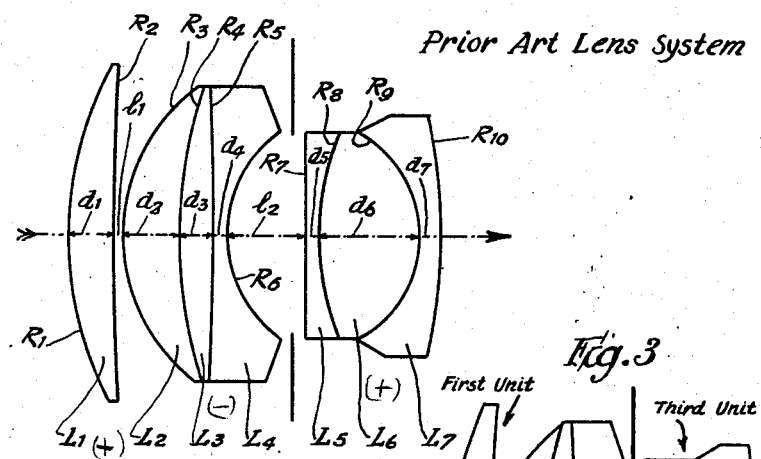
Fig. 1 illustrates diagrammatically the outline of the axial cross section of a lens system of the prior art (see Letters Patent No. 1,975,678).

Referring to Fig. 1, the lens system consists of three lens units separated from each other by air spaces $l_1$ and $l_2$ respectively. The first lens unit—so named because it faces the subject to be photographed—is a collective lens $L_1$ ($d_1$) having the convex face $R_1$ and the concave face $R_2$, which latter face is directed rearwardly. The second lens unit comprises two positive lenses $L_2$ ($d_2$), and $L_3$ ($d_3$) respectively, and one negative lens $L_4$ ($d_4$) all cemented together to form a meniscus which is curved toward the front unit. The positive lens $L_3$ ($d_3$) between the two lenses $L_2$ ($d_2$) and $L_4$ ($d_4$) is made of a lower refractive kind of glass than the two lenses to which it is cemented, as indicated by the numerical statement $nd=1,4892$ in the example following this description of Fig. 1. The concave face $R_6$ of the lens $L_4$ ($d_4$) has a smaller radius of curvature than the outer convex face $R_3$ of the lens $L_2$ ($d_2$).

The third lens unit consists of three lenses $L_5$ ($d_5$), $L$ ($d_6$) and $L_7$ ($d_7$) all cemented together. The lens $L_5$ ($d_5$) which faces the air space $l_2$ is a negative lens and has a lower refractive index, namely $nd=1,5232$, than the positive lens $L_6$ ($d_6$) to which it is cemented. The lens $L_6$ ($d_6$) in turn is cemented to the concavo-convex lens $L_7$ ($d_7$) whose outer convex face $R_{10}$ has a larger radius of curvature than its concave face $R_9$.

Figure 2:
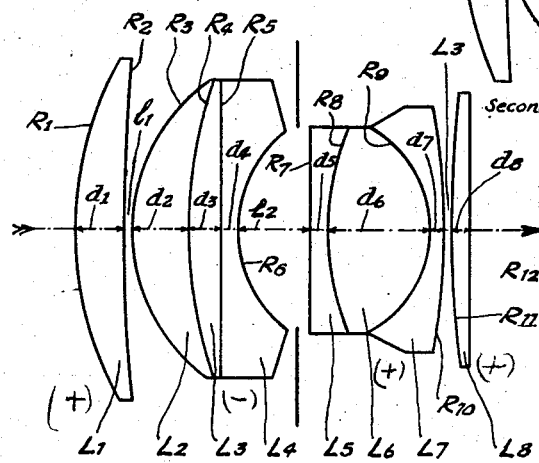
Fig. 2 illustrates diagrammatically and by way of example the outline of the axial cross section of a lens system of the present invention and having the same sharp definition of the image as the lens system disclosed in Fig. 1.

A lens system of this type having a relative aperture of 1:1,5 and a focal length $f=100$ mm., may have the following data:

$R_1 = + 69,21$
$R_2 = +433,84$    $d_1 = 9,33$   $nd=1,6710$   $v=47,2$
$R_3 = + 35,86$    $l_1 = 0,38.$
$R_4 = + 85,78$    $d_2=11,81$   $nd=1,6710$   $v=47,2$
$R_5 = -646,31$    $d_3= 7,05$   $nd=1,4892$   $v=70,1$
$R_6 = + 23,51$    $d_4= 1,90$   $nd=1,7394$   $v=28,2$
$R_7 = \infty$    $l_2=15,24.$
$R_8 = + 51,09$    $d_5= 2,48$   $nd=1,5232$   $v=50,9$
$R_9 = - 22,12$    $d_6=19,81$   $nd=1,6578$   $v=51,2$
$R_{10}=-103,13$    $d_7= 4,57$   $nd=1,5894$   $v=61,2$ Fig. 2 illustrates a lens system in accordance with the present invention and having also a relative aperture of 1:1,5 and a focal length of $f=100$ mm. The lens system consists of four lens units separated from each other by air spaces $l_1$, $l_2$ and $l_3$ respectively. The first three lens units have substantially the same general shape and arrangement as the lens system of Fig. 1, except that according to the specific numerical example described hereinafter a few radii of curvature of a few lenses are different. The fourth lens unit which forms the novel feature of this lens system consists of a single collective lens L8 (d8) whose outer face R12 directed toward the picture plane has a larger radius of curvature than the other face R11 directed toward the third lens unit composed of the lenses L5 (d5), L6 (d6) and L7 (d7).

The complete optical data of the lens system of Fig. 2 may be as follows:

$R_1 = +65,16$
$R_2 = +322,58$
$d_1 = 9,30$ $nd = 1,6689$ $v = 48,8$
$l_1 = 0,23$
$R_3 = +35,86$
$R_4 = +77,31$
$d_2 = 11,10$ $nd = 1,6689$ $v = 48,8$
$d_3 = 7,40$ $nd = 1,4645$ $v = 65,7$
$R_5 = \infty$
$d_4 = 1,90$ $nd = 1,7219$ $v = 28,7$
$R_6 = +23,38$
$l_2 = 15,56$
$R_7 = +914,00$
$R_8 = +53,13$
$d_5 = 3,04$ $nd = 1,5325$ $v = 46,2$
$d_6 = 19,92$ $nd = 1,6689$ $v = 48,8$
$R_9 = -22,09$
$d_7 = 2,37$ $nd = 1,6043$ $v = 56,3$
$R_{10} = -227,7$
$l_3 = 0,10$
$R_{11} = +272,8$
$d_8 = 4,50$ $nd = 1,6689$ $v = 48,8$
$R_{12} = \infty$ This lens system will reproduce the picture with the same sharpness as the lens system of Fig. 1, but with much smaller distortion.

Figure 3:
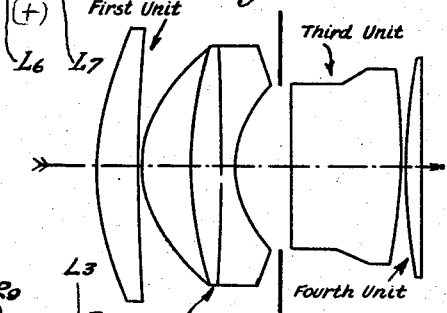
Figure 3 illustrates diagrammatically the outline of the axial cross section of another form of the present invention.

While in both disclosed lens systems the third lens unit L5 (d5), L6 (d6), L7 (d7) is composed of three lenses all cemented together, it is also possible in cases where the demands for quality are more moderate to employ as a third lens unit a single uncemented lens as illustrated in Figure 3.

What I claim is:

1. A lens system of large relative aperture comprising four axially aligned lens units separated from each other by air spaces, the front unit being a simple collective lens, the second unit next to said front unit being made up of at least one positive lens and one negative lens cemented together to form a dispersive meniscus curved toward the front unit and containing at least one dispersing cemented face, one of said positive lenses having a lower refractive index than the negative lens which faces the second air space, the concave outer face of said meniscus having a smaller radius of curvature than the convex outer face of the same, the third lens unit comprising a single collective lens having a convex face directed rearwardly toward the fourth lens unit, and the fourth lens unit consisting of a simple collective lens the convex face of which facing the third lens unit having a smaller radius of curvature than the outer face directed rearwardly, the fourth lens unit having a greater focal length as compared to the length of the system as a whole and spaced from the third lens unit a distance less than the air spacings of any of the other lens units, said units having their radii, focal powers and axial spacing cooperatively co-related to the focal length of the lens system as a whole to give larger relative aperture and lower distortion error for larger picture angles.

2. A lens system of large relative aperture comprising four axially aligned lens units separated from each other by air spaces, the front unit being a simple collective lens, the second unit next to said front unit being made up of at least one positive lens and one negative lens cemented together to form a dispersive meniscus curved toward the front unit and containing at least one dispersing cemented face, one of said positive lenses having a lower refractive index than the negative lens which faces the second air space, the concave outer face of said meniscus having a smaller radius of curvature than the convex outer face of the same, the third lens unit comprising a single collective lens having a convex face directed rearwardly toward the fourth lens unit, and the fourth lens unit consisting of a convexo-plane lens, the convex face of which is directed toward the third lens unit, the fourth lens unit having a greater focal length as compared to the length of the system as a whole and spaced from the third lens unit a distance less than the air spacings of any of the other lens units, said units having their radii, focal powers and axial spacing cooperatively co-related to the focal length of the lens system as a whole to give larger relative aperture and lower distortion error for larger picture angles.

3. A lens of the character described, comprising four lens units in axial alignment and separated by air spaces, the first, third and fourth units being collective and the second unit being dispersive, the first and fourth units being simple lenses, the second and third units being composed of a plurality of cemented components, the second unit being of meniscus shape and including one dispersive cemented face, the third unit including one collective cemented face, the fourth lens unit having a greater focal length as compared to the focal length of the system as a whole and being spaced from the third unit a distance less than the air spacings of any of the other units, said units having their radii, focal powers and axial spacing cooperatively co-related to the focal length of the lens system as a whole to give larger relative aperture and lower distortion error for larger picture angles.

4. A lens system of the character described, comprising four axially aligned lens units separated from each other by air spaces, the first, third and fourth units being collective and the second unit being dispersive, the first and fourth units being simple lenses, the second unit being composed of a plurality of cemented components, the second unit being of meniscus shape and including one dispersive cemented face, the fourth lens unit having a greater focal length as compared to the focal length of the system as a whole and being spaced from the third lens unit a distance less than the air spacings of any of the other lens units, said units having their radii, focal powers and axial spacing cooperatively co-related to the focal length of the lens system as a whole to give larger relative aperture and lower distortion error for larger picture angles.

5. A lens of the character described, comprising four lens units in axial alignment and separated by air spaces, the first, third and fourth units being collective and the second unit being dispersive, the first and fourth units being simple lenses, the second and third units being composed of a plurality of cemented components, the second unit being of meniscus shape and including one dispersive cemented face, the third unit including one collective cemented face, the fourth lens unit having a greater focal length as compared to the focal length of the system as a whole and said units having their radii, focal powers and axial spacing cooperatively corelated to the focal length of the lens system as a whole to give larger relative aperture and lower distortion error for larger picture angles.

6. A lens system of the character described, comprising four axially aligned lens units separated from each other by air spaces, the first, third and fourth units being collective and the second unit being dispersive, the first and fourth units being simple lenses, the second unit being composed of a plurality of cemented components, the second unit being of meniscus shape and including one dispersive cemented face, the fourth lens unit having a greater focal length as compared to the focal length of the system as a whole, said units having their radii, focal powers and axial spacing cooperatively corelated to the focal length of the lens system as a whole to give larger relative aperture and lower distortion error for larger picture angles.

LUDWIG BERTELE.